United States Patent [19]

Saeva

[11] 3,957,348
[45] May 18, 1976

[54] METHOD FOR ALTERING ELLIPTICALLY POLARIZED LIGHT
[75] Inventor: Franklin D. Saeva, Webster, N.Y.
[73] Assignee: Xerox Corporation, Stamford, Conn.
[22] Filed: Mar. 26, 1975
[21] Appl. No.: 562,305

[52] U.S. Cl. .......................... 350/154; 350/160 LC; 252/299
[51] Int. Cl.² .......................................... G02F 1/13
[58] Field of Search .............. 350/150, 154, 160 LC

[56] References Cited
UNITED STATES PATENTS
3,780,307  12/1973  Saeva ............................ 350/150 X Primary Examiner—Edward S. Bauer
Attorney, Agent, or Firm—James J. Ralabate; Michael H. Shanahan; George J. Cannon

[57] ABSTRACT

The optical transitions of extrinsically optically active soluble and insoluble materials become circularly dichroic when in contact with twisted nematic liquid crystalline materials. The circularly dichroic optical properties induced in the normally extrinsically optically active materials are utilized to alter the relative amounts of left and right hand circularly polarized light in elliptically polarized light including producing circularly polarized light.

11 Claims, 4 Drawing Figures

METHOD FOR ALTERING ELLIPTICALLY POLARIZED LIGHT

BACKGROUND OF THE INVENTION

This invention relates to liquid crystalline materials and, particularly, to uses of the combination of the twisted nematic structure in nematic liquid crystalline materials in contact with extrinsically optically active materials. More particularly, this invention relates to specific used of the discovery that optically inactive materials display circular dichroism when in contact with the twisted nematic structure in nematic liquid crystalline materials.

Liquid crystalline substances exhibit physical characteristics, some of which are typically associated with liquids and others which are typically unique to solid crystals. The name "liquid crystals" has become generic to substances exhibiting these dual properties. Liquid crystals are known to appear in three different forms; the smectic, nematic, and cholesteric forms. These structural forms are sometimes referred to as mesophases thereby indicating that they are states of matter intermediate between the liquid and crystalline states. The three mesophase forms of liquid crystals mentioned above are characterized by different physical structures wherein the molecules of the compound are arranged in a manner which is unique to each of the three mesomorphic structures. Each of these three structures is well known in the liquid crystal art.

The twisted nematic structure is well known in the art. When a nematic liquid crystalline material is sandwiched between substrates treated for unidirectional homogeneous alignment, the nematic is externally perturbed into a helical structure when the rubbed surfaces are placed at some angle (other than 0°) with respect to one another. See, for example, M. Schadt and W. Helfrich, *Appl. Phys. Letts.*, 18, 127 (1971), "VoltageDependent Optical Activity of A Twisted Nematic LIquid Crystal."

Twisted nematic cells have been employed in display devices, particularly where electro-optic effects are modulated by the application of an electrical field across layers of nematic liquid crystalline material in the twisted nematic structure. See, for example, U.S. Pat. No. 3,731,986 to Fergason and U.S. Pat. No. 3,781,085 to Leibowitz.

The molecules of the nematic in the twisted structure of nematic liquid crystals can be thought of as arranged in very thin layers with the long axes of the molecules parallel to each other and to the local optic axis of the layers. The direction of the long axes of the molecules in each layer is displaced slightly from the corresponding direction in adjacent layers. This displacement is cumulative over successive layers so that overall displacement traces out a helical path. A comprehensive description of the optical properties of the twisted nematic structure of nematic liquid crystals is given in "Optics in Smoothly Varying Anisotropic Planar Structures: Application to Liquid Crystal-Twist Cells", D. W. Berreman, 63, *J. Opt. Soc. Am.*, 1374 (1973).

Nematic liquid crystals in the twisted structure rotate the plane of polarization of light passing therethrough an amount between 0° and 90° equal to the angular difference between the alignment directions of the substrates. The intrinsic sense of the helical twist can be either right-handed or left-handed.

Extremely large extrinsic circular dichroism has been observed within the electronic transitions of achiral (optically inactive) solutes dissolved in cholesteric mesophases as reported in recently issued U.S. Pat. No. 3,780,304 to F. D. Saeva, et al and in the following articles by F. D. Saeva et al appearing in the *Journal of the American Chemical Society* (JACS): "Cholesteric Liquid-Crystal-Induced Circular Dichroism (LCICD) of Achiral Solutes. A Novel Spectroscopic Technique", Vol. 94, JACS, page 5135 (1972); "Cholesteric Liquid-Crystal-Induced Circular Dichroism (LCICD). V. Some Mechanistic Aspects", Vol. 95, JACS, page 7675 (1973); "Cholesteric Liquid-Crystal-Induced Circular Dichroism (LCICD). VI. LCICD Behavior of Benzene and Some of its Mono- and Disubstituted Derivatives", Vol. 95, JACS, page 7660 (1973); and "Cholesteric Liquid-Crystal-Induced Circular Dichroism (LCICD). VII. LCID of Achiral Solutes in Lyotropic Cholesteric Mesophases", Vol. 95, JACS, page 7882 (1973).

To our knowledge, circular dichroism has not been previously reported as induced in extrinsically optically active materials in contact with the twisted structure of nematic liquid crystalline materials.

It has heretofore been thought by those working in the art as evidenced by the above articles that two mechanisms contributed independently to the existence of Liquid Crystal Induced Circular Dichroism in dissolved materials: (1) helical organization of solute, and (2) the exposure of solute to a helical organization of liquid crystal molecules. My work prior to the present invention indicated that mechanism (2) could be the sole operative mechanism. Shortly after the invention described in this Application, independent data was reported which confirmed that mechanism (1) was not required for the observation of extrinsic LCICD within solutes in the cholesteric mesophase. That is, the solute molecules need not be ordered into helical organization by the mesophase in order to exhibit liquid crystal induced circular dichroism. The data is reported in "The Optical Activity of Achiral Molecules in a Cholesteric Solvent", *J.C.S. Chem. Comm.*, page 712, 1973.

In rapidly growing areas of technology such as liquid crystals new methods, apparatus, compositions and articles of manufacture are often discovered for the application of the new technology in a new mode. The present invention relates to novel and advantageous uses of extrinsically optically active materials in contact with the twisted nematic structure of nematic liquid crystalline materials.

SUMMARY OF THE INVENTION

It is an object of the invention to provide an optical system which can be adapted to function as an optical filter system.

It is a further object of the invention to provide an optical filter system which will alter the relative magnitude of left and right circular polarized light in elliptically polarized light.

The above mentioned objects and advantages and others are realized in accordance with the invention by employing normally extrinsically optically active materials whose electronic transitions, i.e., effect obtained from the interaction of light energy with the electrons of molecules, become circularly dichroic (i.e., show a large preferential absorption of either left hand circularly polarized light (LHCPL) or right hand circularly polarized light (RHCPL) when in contact with the twisted nematic structure of nematic liquid crystalline materials. As used herein, "in contact" includes dissolution of soluble extrinsically optically active material as well as mere physical contact between the nematic and insoluble extrinsically optically active material. It should be understood that by the term "extrinsically optically active materials" we mean both intrinsically optically active and intrinsically optically inactive materials which are optically active or inactive, respectively, out of contact (or when not in contact) with twisted nematic liquid crystalline substances. Both intrinsically optically active and optically inactive materials become extrinsically active when contacted with the twisted nematic structure of nematic liquid crystalline materials. This extrinsic induced behavior may overwhelm and dominate over any intrinsic activity since the specific rotations and molecular ellipticities in the former case are normally substantially larger than that observed for intrinsically active materials.

The extrinsically optically active materials can be soluble or insoluble in the nematic liquid crystalline material and, if insoluble, can be either dispersed in the nematic or provided as a coating in contact with the nematic. Dissolution, dispersion and coating contact all meet the requirement that the extrinsically optically inactive material be "in contact" with the twisted nematic structure of the nematic liquid crystalline material.

"Insoluble" is used herein to mean that dissolution of the material added to or contacted by the nematic liquid crystalline material can not be detected by conventional photometric techniques, such as circular dichroism and optical absorption.

It has been found that when such extrinsically optically active materials are dissolved in or otherwise contacted by twisted nematics, the optically active materials exhibit circularly dichroic behavior within their absorption bands. The optical behavior induced in the normally extrinsically optically active materials is circular dichroism; i.e., a difference absorption of RHCPL and LHCPL.

The invention will be more fully understood from the following detailed description of various preferred embodiments thereof particularly when read in conjunction with the accompanying drawings wherein.

Figure 1:
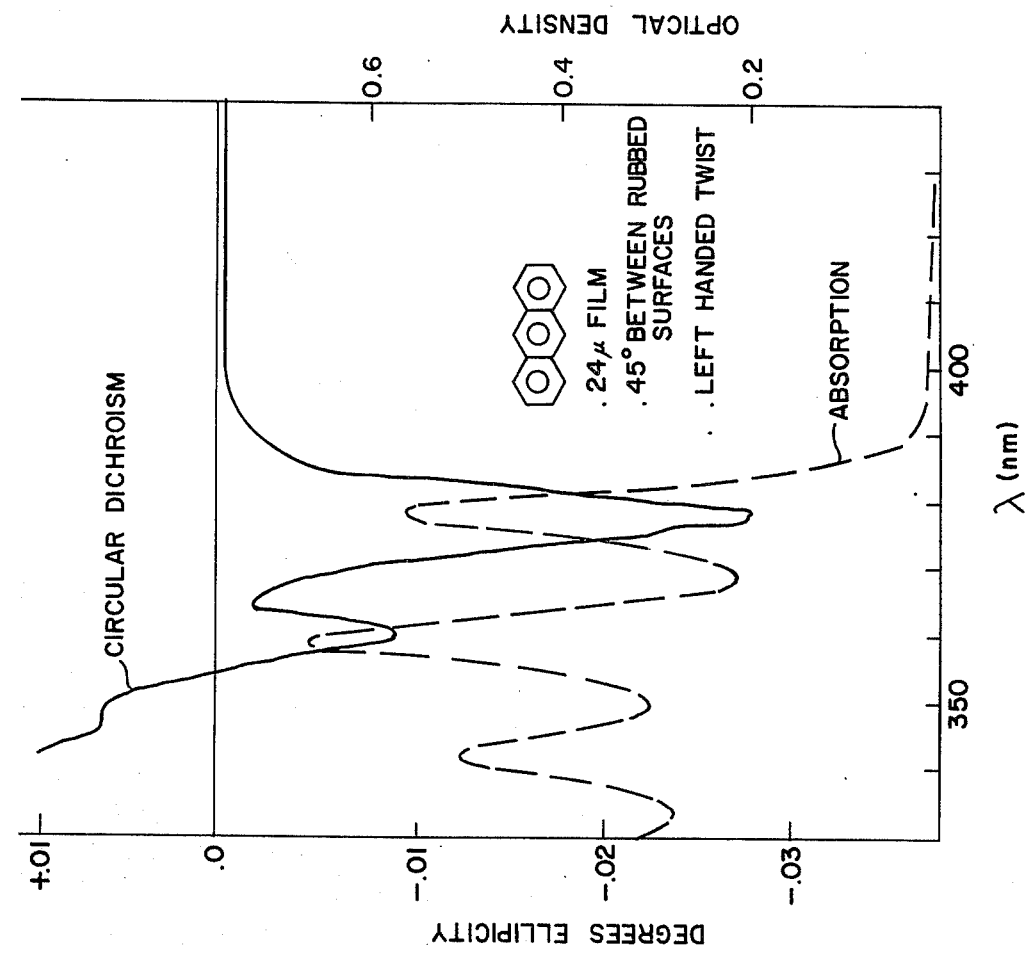
FIG. 1 shows the circular dichroism and absorption spectra of anthracene between 330 and 400 nm in the twisted nematic structure of a 1:1 weight ratio of p-cyanophenylp-butyl benzoate and p-cyanophenyl-p-heptylbenzoate.

Referring now to FIG. 1, there is seen the circular dichroism and absorption spectrum of an about 24 micron thick film of anthracene dissolved in a 1:1 weight ratio of p-cyanophenyl-p-butylbenzoate and p-cyanophenyl-p-heptylbenzoate. The anthracene comprises about 1 wt. % of the solution. The nematic is provided with a left handed 45° twist between the alignment directions of the top and bottom rubbed substrates. The circular dichroism induced in the 360 and 380 nm absorption bands of the anthracene is negative in sign; that is, more right-handed circularly polarized light is absorbed than left-handed circularly polarized light. Conversely, more left-handed circularly polarized light is transmitted than right-handed circularly polarized light.

In the left-handed helical structure CD bands of negative sign ($\epsilon_R > \epsilon_L$) appear at about 360 and 380 nm while positive CD bands appear at about 340 nm. It has been found that the sign of the circular dichroism induced in normally extrinsically optically active materials dissolved in a twisted nematic structure depends upon the polarization of the optical transition of the additive, and the pitch and sense of twist of the nematic. If the polarization of optical transitions of the additive is perpendicular (that is to say, the optical transition moment is aligned perpendicular to the local optic axis of the nematic layers) then the CD sign is negative with a left-handed twisted nematic and is positive with a right handed twisted nematic. If the polarization of optical transition is parallel, then the CD sign is positive with a left-handed twisted nematic and is negative with a right handed twisted nematic.

The sign of circular dichroism induced in insoluble extrinsically optically active materials is independent of the optical transition polarization of the material and is negative for a left hand twisted nematic and positive for a right hand twisted nematic.

Thus, it can be seen that the addition of extrinsically optically active materials whose absorption bands become highly optically active when in contact with a twisted nematic liquid crystalline environment permits a novel and highly advantageous means for tailoring the properties of twisted nematic liquid crystal systems to achieve novel and extremely useful results. These additives can be used to provide a circularly dichroic absorption band.

The additives which can be placed in contact with twisted nematic liquid crystalline substances according to the invention can be soluble or insoluble (as previously defined) in the twisted nematic environment and should have optical transitions in some regions of the electromagnetic spectrum. Any suitable extrinsically optically active soluble or insoluble material can be used according to the invention. Typical suitable extrinsically optically active materials include, among others soluble or insoluble organic and inorganic dyes and pigments, aromatic compounds such as benzene, naphthalene, anthracene and the like; azo compounds such as arylazonaphthols, azobenzenes, etc.; nitro compounds such as nitrobenzene, nitroarylazonaphthols and the like; nitroso compounds such as nitrosonaphthalene and the like; anil compounds such as benzylidene aniline, etc.; carbonyl compounds such as acetone, acetophenone, benzophenone and the like; thiocarbonyls such as thioacetophenones, thioacetone, thiobenzophenone, and the like; alkenes such as butadiene, cyclohexane, etc.; heterocyclics such as furans, aziridines, pyridines and the like, alkanes such as hexane, dodecane and the like; metallic complexes; dyes such a polymethin, sulfur, indigo and anthraquinone dyes; and mixtures thereof.

Typical methods of insolubilizing any of the above soluble compounds include adsorbing on suitable surfaces and converting to ionic derivatives.

Generally speaking, the use of extrinsically optically active additive materials that absorb in the visible region of the spectrum such as, for example, inorganic and organic pigments, will be preferred in applications where visible light is to be employed.

Of course, it should be recognized that the above classes of materials are intended to be only illustrative of the insoluble and soluble additives which will provide the induced circular dichroism behavior.

The amount of material which can be dissolved or dispersed in a twisted nematic structure can vary over an extremely wide range. As little as about 0.01% by weight of optically inactive material in the solution or dispersion can provide the induced optical activity. Of course, the upper limit of the amount of additive which can be incorporated into any particular nematic liquid crystal composition, and which can go as high as about 90% by weight, is controlled by the requirement that the total environment must retain its twisted nematic character after the addition of the optically active material (insoluble or soluble).

Any suitable nematic liquid crystal substances mixtures thereof or combinations having nematic liquid crystalline characteristics may be employed in the invention. Typical suitable nematic liquid crystals include p-azoxyanisole, p-azoxyphenetole, p-butoxybenzoic acid, p-methoxy-cinnamic acid, butyl-p-anisylidene-p-aminocinnamate, anisylide p-aminophenylacetate, p-ethoxy-benzylamino-$\alpha$-methyl-cinnamic acid, 1,4-bis(p-ethoxy benzylidene) cyclohexanone, 4,4'-dihexyl-azoxybenzene, 4,4'-diheptylozyazoxybenzene, anisal-p-amino-azo-benzene, anisal dazine, anils of the generic group (p-n-alkoxybenzylidene-p-n-alkyanilines), such as p-methoxy-benzylidene-p'-n-butylaniline; nematic compounds of the alkoxybenzylidene-amino-alkyphenone group, such as methoxybenzylidene-aminobutyrophenone and methoxybenzylidene-amino-valerophenone; p-cyanophenyl-p-butyl benzoate and p-cyanophenyl-p-heptylbenzoate; mixtures of the above and others.

Mixtures of liquid crystals can be prepared in organic solvents such as chloroform, petroleum ether and others which are typically evaporated from the mixture leaving the liquid crystal composition. Alternatively, the individual components of the liquid crystalline mixture can be combined directly by heating the mixed components above the isotropic transition temperature.

The above lists of typical suitable nematic liquid crystalline substances are intended to encompass mixtures of the above. These lists are intended to be representative only and are not to be constructed as being exhaustive or limiting to the invention to the specific materials mentioned. Although any nematic liquid crystalline material provided in the twisted nematic structure is suitable for use in the present invention, it should be recognized that various different nematic liquid crystal substances will only possess the necessary properties which make them suitable for use according to the invention at some specific temperature range which may be at room temperature or substantially below or above room temperature. However, all of the various substances, mixtures or combinations thereof will function according to the method at some temperature. Typically, the materials of the invention will be used at or near room temperature. Thus, it is preferred to employ liquid crystal substances which have a liquid crystal state at or near room temperature. Generally speaking, the liquid crystal substances will preferably be in the liquid crystal state at the desired operational temperature.

Typical suitable thicknesses of films or layers of nematic liquid crystalline materials are from about 0.5 to about 50 microns, although any thickness which will provide the desired effect can be used.

The twisted nematic structure is provided by sandwiching the nematic liquid crystalline material between two substrates treated to impart unidirectional homogeneous alignment wherein the homogeneous alignment direction of one substrate makes an angle between 0° and 90° with the homogeneous alignment direction of the other substrate.

The substrates may be treated by any technique suitable for providing homogeneous alignment of the nematic liquid crystalline material. Typical suitable techniques include the Chatelain technique of unidirectional rubbing as disclosed in P. Chatelain, *Bull. Soc. Franc. Min. Crist.*, 66, 105 (1943); providing a coating of aligning agent in contact with layer 4 of nematic liquid crystalline material such as, for example, one of the homogeneous aligning agents listed in Vol. 61, No. 7, *Proceedings of the IEEE*, p. 823, July, 1973 in the article "Surface-Produced Alignment of Liquid Crystals" by Kahn, Taylor and Schonhorn; and the so-called Janning Technique described by J. L. Janning in *Appl. Phys. Letts.*, 21, 173 (1972).

The nematic liquid crystalline material is provided in the twisted nematic structure by about 0° to about 90° angular displacement between alignment directions of the treated substrates. The chatelain and other surface treatments for homogeneous alignment can be employed. The substrates can be treated for the same direction alignment and one rotated or twisted from about 0° to about 90° with respect to the other to provide the angular displacement, or one substrate can be treated at an angle with respect to the treatment for the other substrate in order to provide the angular displacement. The direction of angular displacement determines the chirality or sense of twist of the twisted nematic structure. The standard used herein is the direction going from the bottom substrate to the top substrate, within about 0° to about 90°. If the direction from the bottom substrate alignment direction to the top substrate alignment direction within 0° to 90° is counterclockwise then the chirality of the helix is left handed. If the direction from the bottom substrate alignment direction to the top substrate alignment direction within about 0° to about 90° is clockwise then the chirality of the helix is right-handed.

The substrates may be of any shape and the homogeneous alignment treatment may employ aligning agents and angular film deposition (Janning Technique). Further, the substrates may both be treated to have the same alignment direction and the top substrate is then twisted or rotated to form an angle of from about 0° to about 90° with the other. A clockwise rotation of the top with respect to the bottom results in a right-handed sense of twist. A counterclockwise rotation of the top with respect to the bottom results in a left-handed sense of twist.

Once the chirality or sense of twist is established, it remains the same for when the cell is flipped over so that the former bottom substrate is now the top substrate. This can be easily visualized by crossing two pencils and viewing them from opposite sides.

At exactly 0° or no angular displacement there is homogeneous alignment of the nematic layers (all pointing in one direction). At exactly 90° angular displacement the chirality of the twisted nematic structure generally includes a predominance of one handedness with the presence of the other handedness. Exactly 0° and 90° are therefore not preferred in utilizing the twisted nematic structure and at 90° there is non-uniformity of chirality.

EXAMPLE I

A nematic liquid crystalline composition is prepared by mixing one part by weight p-cyanophenyl-p-butyl benzoate (available from Aldrich Chemical Co., catalog number 18-032-7) and one part by weight p-cyanophenyl-p-heptyl benzoate (available from Aldrich Chemical Co., catalog number 18-031-9). Anthracene, an extrinsically optically active material is dissolved in the nematic composition in an amount comprising about one percent by weight of the total solution.

A sandwich member is formed by placing the nematic-additive solution between two quartz substrates treated by the Chatelain rubbing technique. Both substrates are rubbed uniformly in the same direction and, after the nematic-additive solution is placed on the bottom substrate the top substrate is placed on the layer of solution and rotated counterclockwise about 45°. The nematic assumes the twisted nematic structure with a left-handed helix.

The absorption spectrum of the anthracene additive is analyzed with a Carey 15 Spectrophotometer. The analysis is shown in FIG. 1.

The sandwich member is placed in a Cary 61 Spectropolarimeter operating in the circularly dichroic mode and the circular dichroism spectrum of the anthracene additive is measured taking into consideration the polarization properties of the photomultiplier. Circular dichroism is exhibited within the optical transitions of the anthracene molecules. The observed circular dichroism is shown in FIG. 1.

EXAMPLE II

An isotropic solution of anthracene in chloroform solvent is placed in the Cary 61 Spectropolarimeter operating in the circularly dichroism mode and the absorption spectrum of the anthracene is analyzed for circular dichroism. Circular dichroism is not exhibited. This indicates that the circular dichroism exhibited by anthracene in Example I is induced by contact with the twisted nematic structure.

EXAMPLE III

The sandwich member of Example I is heated above the isotropic temperature for the nematic liquid crystalline composition. While so heated, the absorption spectrum of the anthracene in the circular dichroism mode. Circular dichroism is not exhibited.

The sandwich member is allowed to cool below the isotropic temperature and tramsforms from the isotropic to the twisted nematic structure. The circular dichroism of FIG. 1 is exhibited upon cooling. This demonstrates that circular dichroism is induced within the absorption spectrum of anthracene in contact with the twisted nematic structure.

EXAMPLE IV

The sandwich member of Example I is prepared except that the extrinsically optically inactive additive is methylene blue rather than anthracene. A helium-neon laser emits radiation at 6328A, within the methylene blue absorption band, is utilized. The 6328A radiation is directed to first pass through a linear polarizer (the emerging beam containing equal amounts of right hand circularly polarized light and left hand circularly polarized light), to then pass through the sandwich member, and then to pass through a quarter wave plate-linear polarizer combination and impinge on an observer's eye.

The quarter wave plate can be oscillated between two positions 90° apart, each position providing an orientation of the retardation axis of the quarter waveplate to the transmission direction of the second linear polarizer of about 45°. The intensity of light is observed for each of the two positions of the quarter waveplate retardation axis and will be different; that is, the light intensity will be more intense at one position than the other. The sandwich member is heated to the isotropic temperature of the liquid crystalline material and the light intensity becomes equal at both positions of the quarter wave plate.

The sandwich member is removed and the observation through the oscillating quarter waveplate is continued. It is noted that the light at each position is of equal intensity and that the intensity at each position is greater than the intensity observed at the respective position prior to removal of the sandwich member.

This demonstrates that the relative amounts of right handed and left handed circularly polarized light components are altered by the circular dichroism induced in the visible absorption band of methylene blue.

EXAMPLE V

The sandwich member of Example I is prepared as in Example I. The Cary 61 Spectropolarimeter is placed in the circular dichroism mode. (In the circularly dichroic mode, the spectropolarimeter normally emits alternately right hand circularly polarized light pulses and left hand circularly polarized light pulses of equal intensity.) These pulses are of selectively variable wavelength and are produced by passing monochromatic light through a linear polarizer and a Pockel cell quarter waveplate (a single crystal of potassium dideuterium phosphate). When a voltage is applied across the Pockel cell, the normally uniaxial single crystal of potassium dideuterium phosphate becomes biaxial with the plane containing the induced optical axes being inclined at 45° to the X and Y crystallographic axes. The single crystal is oriented such that the induced axes are at ± 45° relative to the plane of polarization of the linear polarizer. As a result, if the electric field produces a retardation of 90° ($\lambda/4$) between the components parallel to the induced axes, the emergent beam of light will be circularly polarized. By altering the voltage applied to the single crystal the retardation can be varied from 90° ($\lambda/4$) whereupon the emergent beam becomes elliptically polarized and contains unequal amounts of RHCPL and LHCPL. The voltage to the Pockel cell is adjusted to produce elliptically polarized light and the relative intensities of RHCPL and LHCPL are noted.

The sandwich member is then placed in the Carey 61 and it is noted that the intensities of both RHCPL and LHCPL emerging about about 360 nm through the sandwich have been diminished, and, that the relative intensities of RHCPL and LHCPL emerging from the sandwich have been altered. That is, the ellipticity of the elliptically polarized light produced by the adjusted Pockel cell has been changed by passing through the sandwich member. The circular dichroism is of negative sign. The same results occur with light at about 380 nm.

EXAMPLE VI

Example V is repeated except that, in preparing the sandwich member according to Example I, the top substrate is rotated clockwise about 45° and imparts a right-handed sense of twist or chirality to the resulting twisted nematic structure. Circular dichroism of positive sign is exhibited at 360 nm and 380 nm. The ellipticity of the elliptically polarized light has been changed by passing through the sandwich member.

EXAMPLE VII

The right-handed twisted nematic sandwich member of Example VI is placed back to back with the left-handed twisted nematic sandwich member of Example I, and both inserted in the Carey 61 Spectropolarimeter adjusted to produce elliptically polarized light. The intensity detector indicates that substantially the same relative amounts or intensities of right hand and left hand circularly polarized light (i.e., ratio of RHCPL to LHCPL) emerges from the combination as was present in the incident radiation but at an intensity below the original incidence intensity at 360 nm and far below the original intensity at 380 nm. The ellipticity change of one member cancels out that of the other member with zero net ellipticity change.

Figure 2:
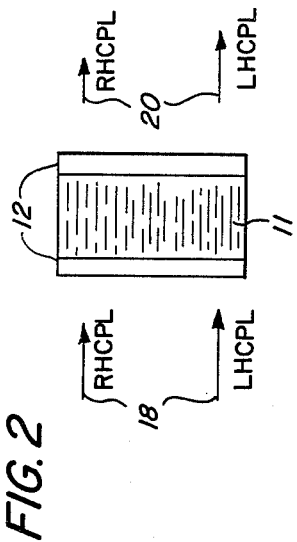
FIG. 2 is a schematic side cross-sectional view of a first embodiment of a typical optical filter constructed according to the invention.

Referring now to FIG. 2 for a first embodiment of the invention, there is seen between substrates 12 a layer 11 of a twisted nematic liquid crystalline material containing a dissolved extrinsically optically active additive having an absorption band in the wavelength region of incident radiation 18. Radiation 18 is elliptically polarized light containing unequal amounts of RHCPL (right hand circularly polarized light) and LHCPL (left hand circularly polarized light). The nematic in layer 11 is in the twisted nematic structure with a left hand sense of twist or chirality. Emerging radiation 20 is less intense than incident radiation 18, contains unequal amounts of RHCPL and LHCPL and the relative amounts of RHCPL and LHCPL is altered from that of radiation 18.

Figure 3:
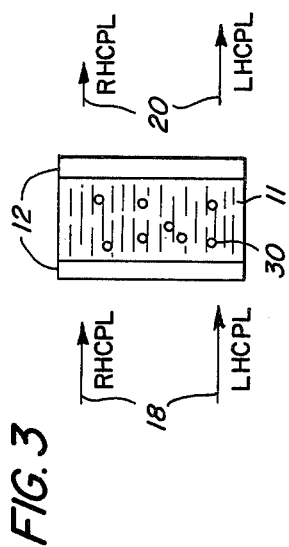
FIG. 3 is a schematic side cross-sectional view of a second embodiment according to the invention.

FIG. 3 schematically depicts a second embodiment of the invention. Nematic liquid crystalline film 11 having particles 30 of insoluble extrinsically optically active additive dispersed therein is contained between substrates 12. In order to take advantage of the circular dichroism induced in the particles 30, incident light radiation 18 should, of course, have wavelengths within the absorption band of the insoluble additive particles 30.

Substrates 12 may comprise any suitable material, flexible or rigid, which is optically isotropic and transparent to the incident light radiation and which is nonreactive with the liquid crystalline film. Typical suitable materials include glass, fused silica and any other materials having the required characteristics.

The optical filter, generally speaking, is utilized for altering the relative amounts of RHCPL and LHCPL components in elliptically polarized light. In the present invention, any number of nematic liquid crystal films to which an extrinsically optically active soluble or insoluble material has been added can be used to alter the relative amounts of circularly polarized components. Also, a single film of a twisted nematic liquid crystalline composition containing any number of extrinsically optically active soluble or insoluble materials may be utilized.

Figure 4:
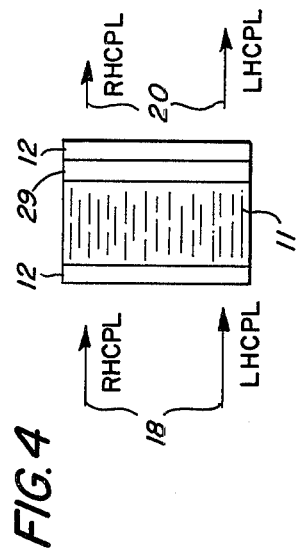
FIG. 4 is a schematic side cross-sectional view of a third embodiment.

FIG. 4 schematically illustrates a third embodiment of the invention wherein the extrinsically optically inactive additive is an insoluble coating 29 and is in contact with a nematic liquid crystalline film 11. The insoluble material need only be in intimate contact with the liquid crystalline material. Any of the aforementioned insoluble materials may be used and may be coated upon a suitable substrate such as glass or thin quartz and other suitable substrates. Any suitable method of forming a coating of insoluble material may be used. For example, sublimation by heating the insoluble material in a vacuum can be employed. The insoluble coating is then treated to produce alignment, preferably by Chatelain rubbing, in order to effect the twisted nematic structure as previously described while remaining in contact with the nematic.

While the invention has been described in detail with respect to various preferred embodiments thereof, it is not intended to be limited thereto but rather it will be appreciated by those skilled in the art that modifications and variations are possible which are within the spirit of the invention and the scope of the claims.

For example, a plurality of sandwich members can be employed as in Example V to change the amount of RHCPL and LHCPL in incident light. Where the plurality is an even number as in Example V the relative amounts of RHCPL and LHCPL will not change if all characteristics of the members are the same except chirality and if the chiralities are paired (that is, one left hand twisted nematic member paired with one right hand twisted nematic). For an even number plurality, the RHCPL and LHCPL components in the emerging light are present in the ratio one to the other as in the incident radiation but the amount of each has been changed relative to the amount of RHCPL and LHCPL in the incident radiation. In the odd number plurality, even where all but one member are provided in matched pairs, the ratio of RHCPL to LHCPL (or vice versa) in the emerging light is altered from that of the incident radiation and the amount of RHCPL and LHCPL in the emergent beam is less than that of the incident radiation.

Further, one of the right hand and left hand circularly polarized light components in elliptically polarized light can be completely absorbed by the induced circular dichroism within the absorption band of the extrinsically optically active material leaving only the other handedness of circularly polarized light in the emergent beam of light. This effect is intended herein to be included in the phrase "altering the relative amounts of right hand and left hand circularly polarized light components in elliptically polarized light."

What is claimed is:

1. A method of altering the relative amounts of right-handed and left-handed circularly polarized light components in elliptically polarized light having a wavelength within a region of interest, comprising:
    a. providing an optical filter comprising a nematic liquid crystalline composition in the twisted nematic structure in contact with an extrinsically optically active material, said extrinsically optically active material having an absorption band defining said region of interest; and
    b. directing a beam of elliptically polarized light comprising right-hand and left-hand circularly polarized light at a wavelength within said region of interest through said optical filter.

2. The method of claim 1 wherein said extrinsically optically active material is soluble in said nematic liquid crystalline composition.

3. The method of claim 2 wherein said extrinsically optically active material is present in an amount from about 0.01% to about 90% by weight of the resulting solution.

4. The method of claim 1 wherein said extrinsically optically active material is insoluble in said nematic liquid crystalline composition.

5. The method of claim 4 wherein said extrinsically optically active material is dispersed in said nematic liquid crystalline material.

6. The method of claim 5 wherein said extrinsically optically active material is present in an amount from about 0.01% to about 90% by weight of the resulting dispersion.

7. The method of claim 4 wherein said extrinsically optically active material is provided in layer configuration.

8. The method of claim 1 wherein said nematic liquid crystalline composition comprises a mixture of p-cyanophenyl-p-butyl benzoate and p-cyanophenyl-p-heptyl benzoate.

9. The method of claim 1 wherein said extrinsically optically active material comprises a member selected from the group consisting of: aromatic compounds, azo compounds; nitro compounds, nitroso compounds; anil compounds; carbonyl compounds; thiocarbonyl compounds; alkenes; heterocyclic compounds; alkanes; and mixtures thereof.

10. The method of claim 9 wherein said extrinsically optically active material has an absorption band in the visible region of the electromagnetic spectrum.

11. The method of claim 9 wherein said extrinsically optically active material is selected from the group consisting of anthracene and methylene blue.

* * * * *